United States Patent [19]

Gronenberg et al.

[11] Patent Number: 5,197,439
[45] Date of Patent: Mar. 30, 1993

[54] METHOD AND DEVICE FOR OPEN-LOOP CONTROL OF A SOLENOID-VALVE REGULATED FUEL-METERING SYSTEM

[75] Inventors: Roland Gronenberg; Joachim Tauscher, both of Stuttgart, Fed. Rep. of Germany

[73] Assignee: Robert Bosch GmbH, Stuttgart, Fed. Rep. of Germany

[21] Appl. No.: 893,340

[22] Filed: Jun. 3, 1992

[30] Foreign Application Priority Data

Jun. 21, 1991 [DE] Fed. Rep. of Germany ....... 4120461

[51] Int. Cl.$^5$ ............................................. F02M 37/04
[52] U.S. Cl. ..................................... 123/506; 123/500
[58] Field of Search ............... 123/500, 501, 506, 458, 123/436, 419

[56] References Cited

U.S. PATENT DOCUMENTS

| | | | |
|---|---|---|---|
| 4,104,990 | 8/1978 | Frobenius | 123/436 |
| 4,180,037 | 12/1979 | Hobo et al. | 123/506 |
| 4,216,752 | 8/1980 | Galan | 123/506 |
| 4,357,662 | 11/1982 | Schira et al. | 123/436 |
| 4,395,987 | 8/1983 | Kobayashi et al. | 123/506 |
| 4,489,698 | 12/1984 | Höfer et al. | 123/506 |
| 4,509,487 | 4/1985 | Mowbray | 123/458 |
| 4,527,531 | 7/1985 | Koyanagi et al. | 123/501 |
| 4,653,454 | 3/1987 | Konishi et al. | 123/506 |
| 4,757,795 | 6/1988 | Kelly | 123/501 |
| 4,777,921 | 10/1988 | Miyaki et al. | 123/506 |
| 4,779,595 | 10/1988 | Fujimori | 123/436 |
| 4,788,960 | 12/1988 | Oshizawa | 123/506 |
| 4,831,988 | 5/1989 | Hoefker | 123/506 |
| 4,858,158 | 8/1989 | Ishikawa | 123/436 |
| 4,936,277 | 6/1990 | Deutsch et al. | 123/436 |
| 4,969,600 | 11/1990 | Nicol | 123/506 |
| 5,105,788 | 4/1992 | Engel | 123/436 |

FOREIGN PATENT DOCUMENTS

4004110 8/1991 Fed. Rep. of Germany .

Primary Examiner—E. Rollins Cross
Assistant Examiner—Thomas Moulis
Attorney, Agent, or Firm—Richard L. Mayer

[57] ABSTRACT

A method and device for controlling a solenoid-valve-regulated fuel-metering system. Given the desired angular position of a fuel pump camshaft at the beginning of fuel delivery and the desired angular duration of fuel delivery, the method and device of the present invention, while accounting for the switching time of the solenoid valve, determines the trigger instant and shut-off instant for at least one solenoid valve. The present invention achieves more accurate and stable fuel-metering by treating the switching time of the solenoid valve as an angular quantity.

20 Claims, 5 Drawing Sheets

METHOD AND DEVICE FOR OPEN-LOOP CONTROL OF A SOLENOID-VALVE REGULATED FUEL-METERING SYSTEM

FIELD OF THE INVENTION

The invention relates to a method and device for the control of fuel-metering systems for internal-combustion engines. More specifically, it pertains to the open-loop control of solenoid-valve-regulated fuel-metering systems.

BACKGROUND OF THE INVENTION

Devices and methods for controlling solenoid-valve-regulated fuel-metering systems are well known in the automotive technology.

German Patent Application No. 40 04 110 discloses a method and device for controlling a diesel engine using a solenoid-valve-regulated fuel pump. The fuel pump described therein includes a pump piston, driven by a camshaft, which pressurizes the fuel and delivers it to the individual cylinders. The beginning and end of fuel delivery are actuated by means of at least one solenoid valve. A control unit calculates trigger instants for the solenoid valve in accordance with markings configured on a shaft.

A problem with known systems arises by virtue of the fact that the fuel-metering control unit emits trigger signals based upon time quantities. The exact beginning of fuel injection must take place when the engine camshaft assumes a particular angular position. Injection ends when the camshaft has rotated through a specific angular displacement from its angular position at the beginning of injection. For this reason, time quantities must be converted into angular displacements and vice versa using the rotational speed of the camshaft as the conversion factor. The accuracy of this calculation depends directly on the accuracy of measuring the rotational speed.

In the prior art, the instantaneous rotational speed at the sampling instant immediately prior to calculation is used to convert between time quantities and angular displacements.

A method and device for so controlling a solenoid-valve-regulated fuel pump are described in German Patent Application No. 40 04 107. Given the desired starting point of injection and the desired duration of fuel delivery, the electronic control system, disclosed therein, determines the trigger instant and the shut-off instant for one or more solenoid valves. That system also accounts for the switching time of practical solenoid valves. The switching time of a solenoid valve is that time which elapses between the application of a triggering signal and the completed reaction of the solenoid valve. In the system described in the aforementioned patent, the switching times of the solenoid valves are handled as time quantities. Due to the fact that the switching time of the solenoid valves follows from a corresponding reduction in the residual times, the influence of the switching times is not adequately compensated for, causing inaccurate fuel-metering.

The method and device of the present invention overcome the inaccuracies of fuel-metering in known systems.

SUMMARY OF THE INVENTION

In the device of the present invention, substantially more precise fuel-metering is possible because the switching times of the solenoid valves are handled as angular displacements.

The advantage of representing the solenoid switching time TA as an angular displacement is particularly true in systems operating at high rotational speeds and using slow solenoid valves with long switching times. The device of the present invention determines the angular equivalent of a time quantity using an average rotational speed value. The angular range over which the rotational speed is averaged is flexibly adapted to the angular displacement corresponding to the switching time. This feature of the present invention makes it possible to minimize fluctuations in the switching time resulting from errors in sampling the instantaneous rotational speed.

Furthermore, the reliability of the device of the present invention is improved over known systems. As rotational speed rises and the angular displacement representing the trigger time is kept constant, the solenoid valve switching times are compensated for simply by moving up the entire solenoid trigger pulse to an earlier time. This has the effect of reducing the quantity of fuel injected as rotational speed increases. This effect contributes considerably to the stability of operation of the internal-combustion engine.

In systems embodying the present invention in which a pump element as well as a solenoid valve are allocated to each cylinder of an internal-combustion engine, only the average switching time of the several solenoid valves is represented as an angular displacement. Therefore, samples from control system are used to determine the angular equivalent from a time quantity. The advantage of this procedure is that the same extrapolation base for the trigger instant can be used for all working points independently of the particular solenoid valve.

The method and system of the present invention works with standard valves. Furthermore, small injection quantities are possible, as are required, for instance, during preliminary fuel-injection. In addition, an improved reproducibility of working points is attained over various solenoid valves.

DETAILED DESCRIPTION OF THE DRAWINGS

Figure 1:
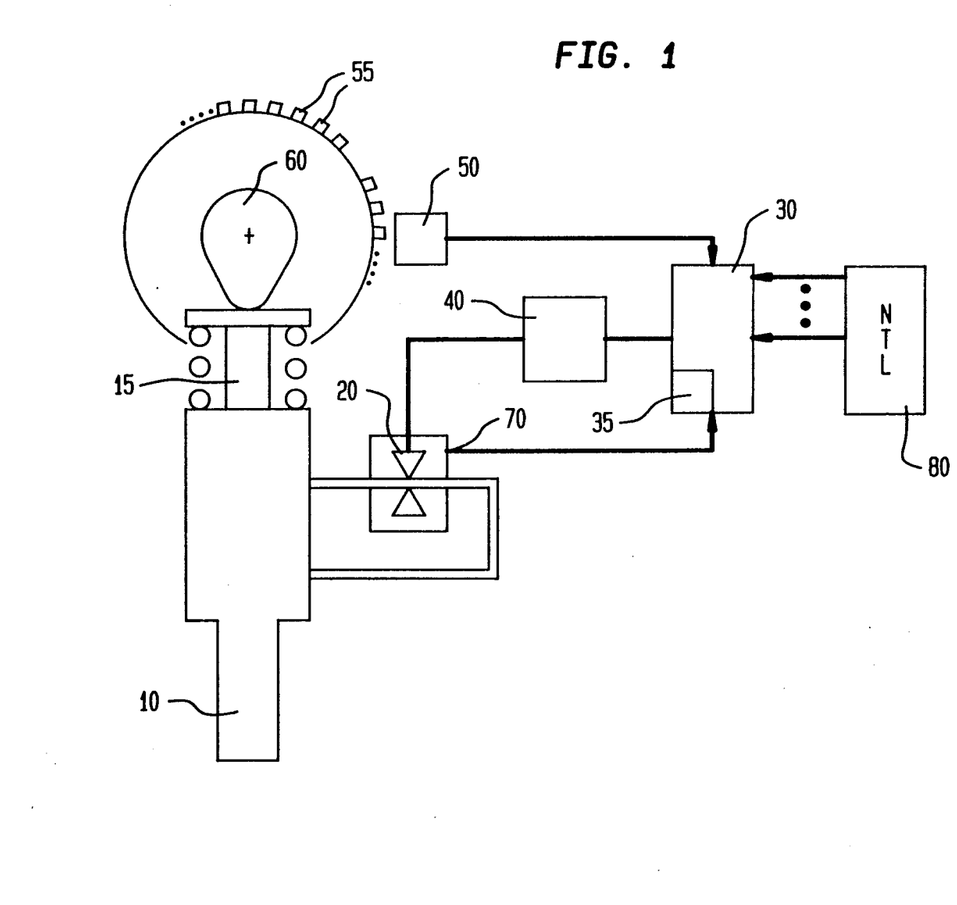
FIG. 1 is a schematic representation of a fuel-metering system incorporating the control system of the present invention.

FIG. 1 illustrates a control system for a solenoid-valve-regulated fuel pump of a diesel engine. Fuel is pumped to the individual cylinders of an internal-combustion engine (not shown) via fuel pump 10 containing pump piston 15. A fuel pump 10 can be provided for each cylinder (pump-nozzle system), or one fuel pump (distribution pump) can alternately meter fuel for several cylinders.

Fuel pump 10 is connected to solenoid valve 20. Valve 20 receives switching pulses, via power output stage 40, from electronic control unit 30 which includes read-only memory 35. Transmitter 70, which is located on solenoid valve 20 or on an injection nozzle (not shown), supplies signals to electronic control unit 30.

Angular marks are located on incremental gear 55 mounted on pump camshaft 60. Two marks define one increment. Incremental gear 50 has at least one increment gap. An increment gap can be realized, for example, by a removing a mark or by other appropriate means.

Measuring device 50 generates an electrical pulse, which is supplied to control unit 30, as each angular mark passes by the measuring device. Thus the signal generated by measuring device 50 is indicative of the angular position of pump camshaft 60. The camshaft or crankshaft of the internal-combustion engine or a shaft coupled to it can act as the pump camshaft. As such, the rotary motion of the engine camshaft or crankshaft can be monitored instead of the rotary motion of the pump camshaft. An induction transducer, an eddy-current detector, or any other detector may be used to measure the position of the pump drive shaft. An example of such detector is measuring device 50. Other sensors 80, such as the average camshaft rotational speed N, temperature T, or load L (gas-pedal position), provide information about additional quantities to control unit 30. The average rotational speed N is sampled over a larger angular range than is the pump camshaft position. For this function, a sensor which supplies a small number of pulses, e.g. 1-4, for each rotation of the shaft, is preferred. These pulses are evaluated to determine the average rotatonal speed N. Determination of the average rotational speed is implemented so as to allow the rotational speed to be averaged preferably over one engine cycle or one combustion process.

Control unit 30 determines the angular position WB which is the desired angular position at which fuel delivery is to begin. It also determines the angular displacement, WD, representing the desired duration of the solenoid trigger signal. These angular quantities are shown in FIG. 2c. WB and WD are determined by control unit 30 in accordance with the parameters acquired by sensors 80 and the rotary motion of pump camshaft 60 as detected by measuring device 50. Based on the values WB and WD, control unit 30 then determines trigger instants A and E (shown in FIG. 3a) for activating power output stage 40. Among other things, one or more of the variables: rotational speed, air temperature, lambda (λ) value, fuel temperature, other temperature values, or a signal characterizing the position of the gas pedal or the desired traveling speed can be entered as operating parameters.

Pump camshaft 60 drives pump piston 15 causing it to pressurize the fuel in fuel pump 10. Solenoid valve 20 controls the fuel pressure. Valve 20 is configured so that no significant fuel pressure is established when it is open. Not until valve 20 is closed, does fuel pressure build up in fuel pump 10. Alternatively, valve 20 can be configured to cause fuel pressure to build up when it is open.

Once a certain fuel pressure has been attained in fuel pump 10, a valve (not shown) opens and the fuel is injected, via an injection nozzle (not shown), into a combustion chamber of the engine. Transmitter 70 indicates at which instant solenoid valve 20 opens or closes. Transmitter 70, which can also be installed on the fuel injection nozzle, generates a signal that indicates the actual beginning or end of the injection of fuel into the combustion chamber. In lieu of the output signal from transmitter 70, a signal indicating the position of solenoid valve 20 can also be used. Such a signal can be obtained by monitoring the currents or voltages applied to the solenoid.

Figure 2A:
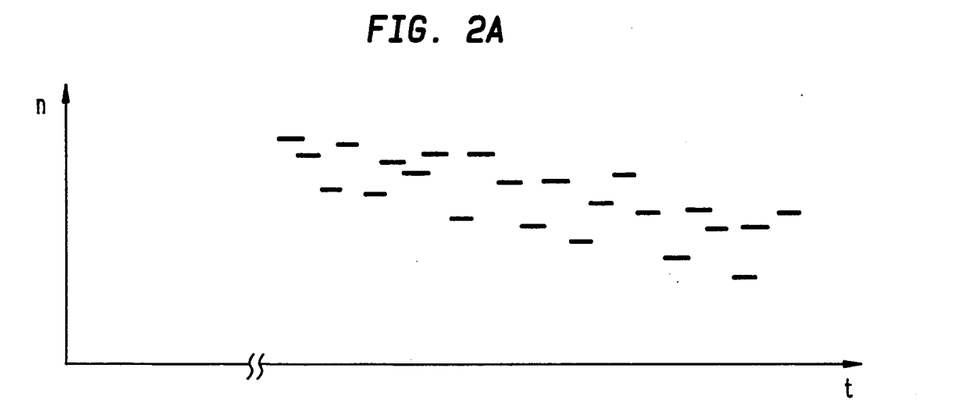
FIGS. 2a–c show signals pertaining to the operation of the present invention.
Figure 2B:
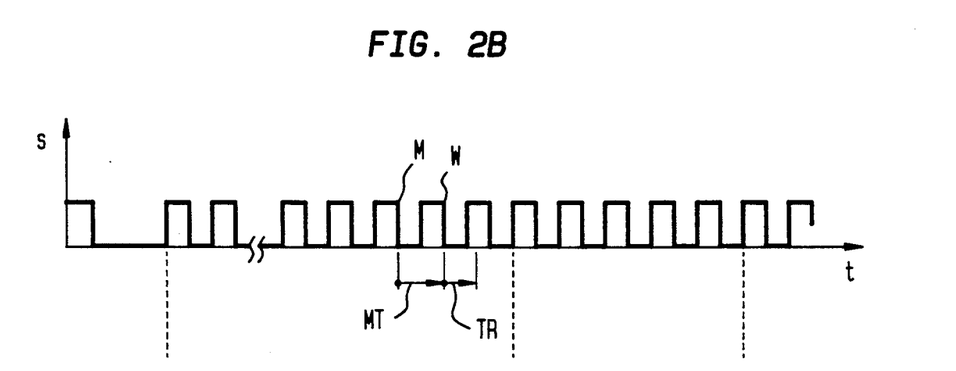
Figure 2C:
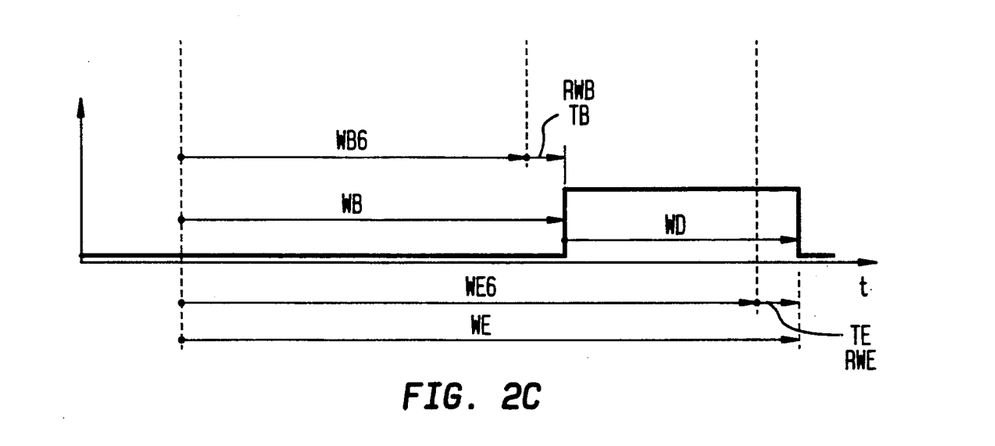

FIG. 2 depicts the conversion of angular displacements into time quantities. FIG. 2a shows a typical pump camshaft rotational speed profile over one fuel-metering cycle. The rotational speed values fluctuate discretely from increment to increment. Within the course of the fuel-metering cycle, the rotational speed decreases over time. FIG. 2b shows the pulses generated by measuring device 50, caused by the rotation of incremental gear 55. Each angular mark on gear 55 generates a pulse in the measuring device 50. Two pulses define one angular increment. It is particularly advantageous when the distance between two angular marks is smaller by a so-called increment than the smallest possible trigger angle WD. An angular increment of 3 degrees is typically satisfactory.

The solenoid valve trigger signal is shown in FIG. 2c with angular quantities determinative of the desired fuel-metering. The quantity of fuel metered depends on the angular displacement WD which determines the duration of fuel delivery. WD is defined by the angular position WB, which indicates the beginning of fuel delivery, and WE, which indicates the end of fuel delivery.

As represented in FIG. 2c, the angular positions WB and WE are divided, respectively, into angular components WBG and RWB, and WEG and RWE. The components WBG and WEG are integral multiples of angular increments. The residual angular components, RWB and RWE, correspond respectively to the residual times TB and TE. The conversion of residual angular components RWB and RWE into residual times TB and TE is accomplished using the instantaneous rotational speed n of pump camshaft 60. The relationship of a residual time Ti to its corresponding residual angular component RWi is expressed by the following expression:

$$Ti = RWi/(6 \times n) \quad (1)$$

The instantaneous rotational speed n is determined over a measuring angular range, MW, which represents the angular displacement of one or more angular increments delineated by points M and W in FIG. 2b. These points are selected to precede, as closely as possible, the particular residual time segment to be calculated. Camshaft 60 rotates through the measuring angular range MW in the measuring time MT. MW and MT are used to calculate the momentary rotational speed n from which the residual time TB or TE is calculated in accordance with the expression above.

The time required to perform the above calculations is represented by the computational time TR. The computation of TB must be completed before fuel delivery begins. Thus the rotational speed of the camshaft must be determined and the calculation of TB must commence earlier than a time interval equal to the sum of the measuring time MT and the computational time TR, before the desired beginning of fuel delivery as defined by WB. This process is repeated to determine TE for the end of fuel delivery.

Figure 3A:
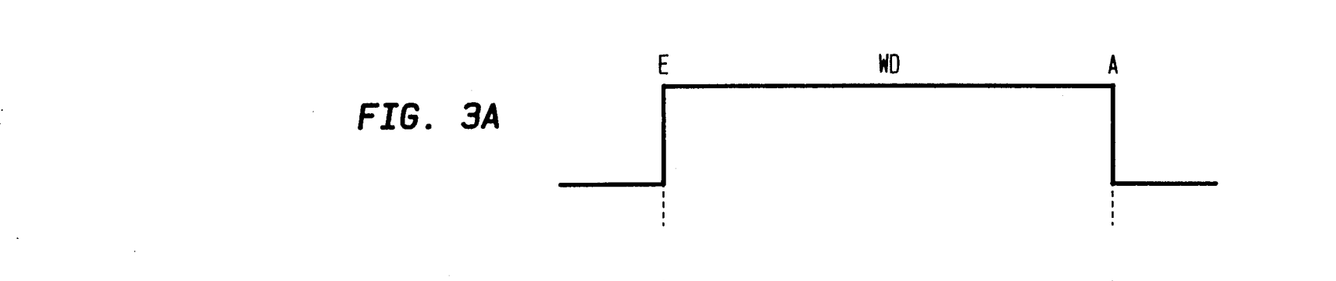
FIGS. 3a–c show signals pertaining to the operation of the device of the present invention.

The trigger signal for solenoid valve 20 is shown in FIG. 3a. At the trigger instant E, the solenoid valve receives a signal causing it to assume a position in which the fuel delivery begins. After the period of time represented by the angular displacement WD, the trigger signal ends at the trigger instant A.

Figure 3B:
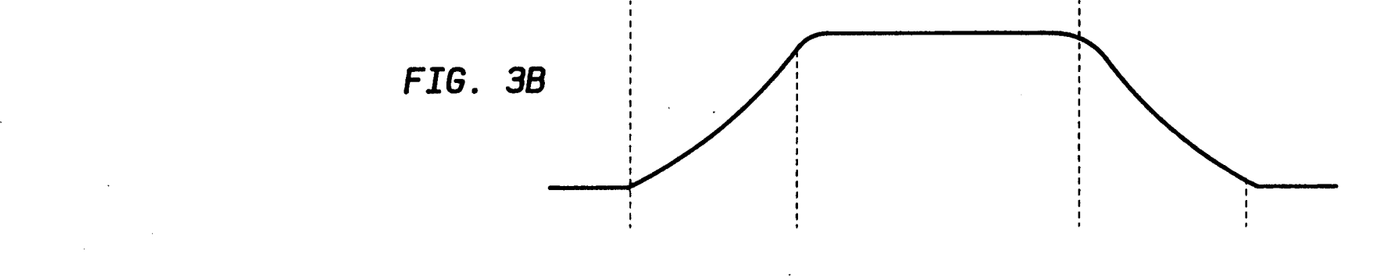

The solenoid valve position is represented by FIG. 3b. Switching time TA elapses between E, the point at which triggering begins, and the actual closing of solenoid valve 20. Likewise, a switching time TA elapses between A, the point at which triggering ends, and the actual opening of solenoid valve 20. The angular displacement WTA corresponds to switching time TA. Although the switching angular displacements for both transitions are shown with the same designation in this example, in practice they will typically be different.

Figure 3C:
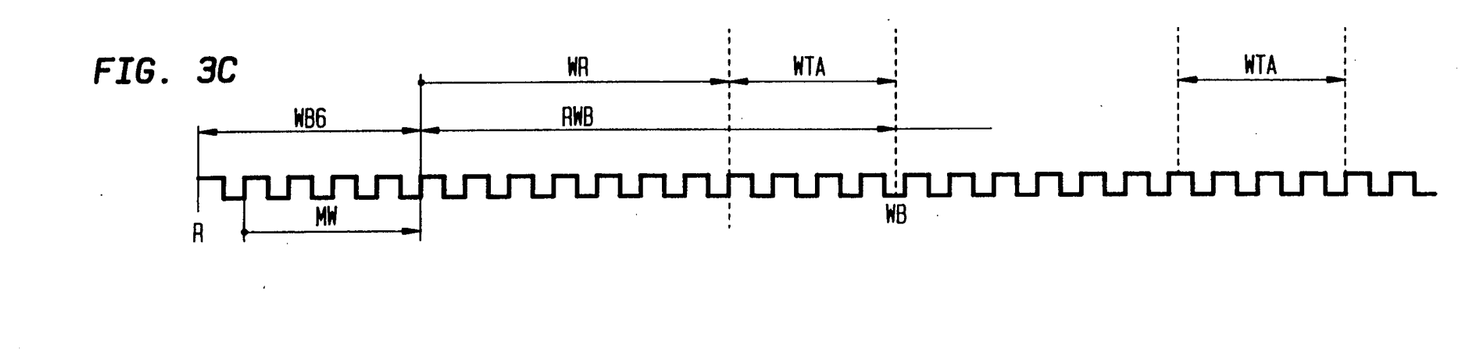

FIG. 3c shows the output signal of measuring device 50, which detects the rotation of incremental gear 55. Control unit 30 specifies the angular displacement WB, between a reference pulse R and the instant at which the solenoid valve is to be completely closed. This instant corresponds to the beginning of fuel delivery. As described above with regards to FIG. 2, WB is broken down into an integral angular component, WBG, and a residual angular component, RWB. RWB is converted into the residual time value TB. Triggering of the solenoid occurs after residual time TB elapses.

In order to compensate for the solenoid valve switching time, TA, the residual angular displacement to the beginning of solenoid triggering, RWB, must be reduced by the angular displacement corresponding to TA, WTA. It is assumed that determining the trigger instant E requires a computational time, TR, which cannot be disregarded. The angular displacement representing the computational time is denoted WR. Thus, as is apparent from FIG. 3c, residual angular component RWB must be greater than the sum of WTA and WR. In order to meet this constraint, integral angular component WBG must be selected accordingly. The calculation of switching angular displacement WTA, given switching time TA, is based on the camshaft rotational speed determined over the measuring angular range MW. The same procedure is followed when determining the shut-off instant A.

Figure 4:
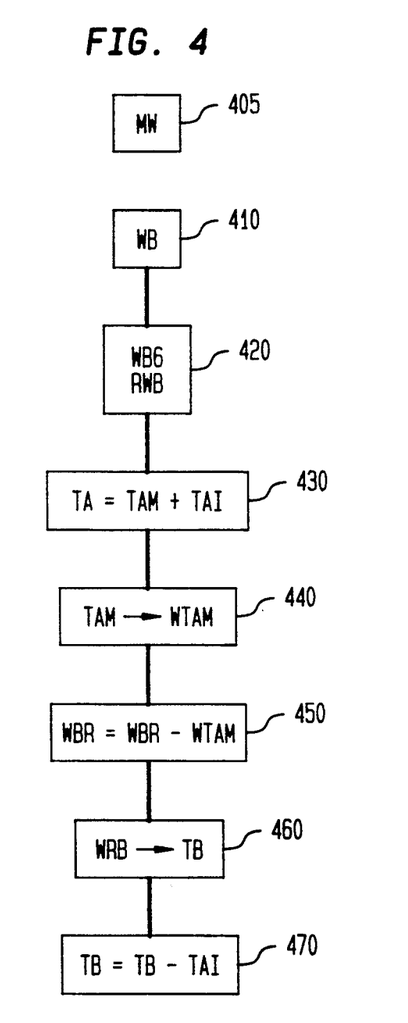
FIG. 4 is a flow chart showing the order in which various quantities pertaining to the operation of the device of the present invention are derived.

The flow chart of FIG. 4 shows the order in which the various quantities are calculated. Step 405 estimates how large the measuring angular range MW should be optimally. The average camshaft rotational speed N is used to estimate how many angular increments the switching time TA spans. This rotational speed signal is continuously available and is accurate enough for purposes of estimation. Given the average rotational speed and TA, an estimated value can be calculated for the switching angular displacement WTA. This value is then divided by the angular displacement of one increment. The result of this division yields an estimated number of angular increments over which WTA extends. Preferably, the measuring angular range MW is selected to be nearly equivalent to the estimated switching angular displacement WTA. This means that the difference between MW and the estimated value of WTA should be no greater than one angular increment.

Step 410 entails determining the angular position WB of the pump camshaft at the beginning of fuel delivery. As is known in the prior art, WB is selected in accordance with various operating conditions. WB can be stored in a table of engine characteristics.

In step 420, WB is broken down into integral component WBG and residual component RWB. As discussed above, the values of these components are selected in accordance with the time constraints attributable to the computation time.

In step 430, the solenoid valve switching time TA is separated into an average switching component, TAM, and an individual switching component, TAI. This approach is appropriate in systems with multiple solenoid valves as where a separate pump element with a solenoid valve is allocated to each cylinder of an internal-combustion engine. TAM denotes the average switching time of all solenoid valves in the system. The individual switching time TAI allows for deviations of the individual solenoid valves from the average value.

The average component TAM is then converted in step 440 into the corresponding angular displacement WTAM. This conversion is carried out in accordance with the following equation $$WTAM = 6 \times n \times TAM \quad (2)$$

where n represents the instantaneous rotational speed of the pump camshaft. The residual angular displacement RWB is subsequently reduced in step 450 by the average switching angle WTAM. The reduced RWB is then converted in step 460 into the residual time TB.

The varying individual switching times TAI are accounted for in step 470, in which the calculated residual time TB for each solenoid is reduced or increased by the corresponding individual switching time TAI. The advantage of this procedure is that the calculation of step 460 need only be performed once each fuel-metering cycle for all solenoid valves. Only step 470, which involves a simple subtraction, need be carried out individually for each solenoid valve.

The present invention also provides for the average switching angle to be entered at the time of the setpoint selection of the beginning-of-delivery angle WB. This can be accomplished by use of an engine characteristics map for the beginning-of-delivery angle WB containing the appropriate values while allowing for the average switching time TAM of the solenoid valves or by reducing the beginning-of-delivery angle WB by the amount of the switching angle.

The accuracy of converting the time quantity TAM into its corresponding angular displacement WTAM, per the above expression, will be adversely affected by errors in determining the instantaneous camshaft rotational speed n. In known systems, in order to obtain the most current possible value, the camshaft rotational speed is evaluated over only one increment. This increment immediately precedes the calculation of the trigger signal. This practice leads to problems, particularly in the case of systems operating at high rotational speeds or with slow solenoid valves having long switching times. In these cases, the solenoid switching time TA will have a relatively large corresponding angular displacement WTA which will extend over several increments.

Measurement of rotational speed over just one increment is susceptible to errors. Such errors can be caused, for example, by computational inaccuracy or sampling error. The effect of even a small error occurring when the rotational speed is measured over one increment will be multiplied when applying this value over a considerably larger angular range.

To avoid this multiplying effect, the method of the present invention calls for matching the measuring angular range MW over which the rotational speed is determined, to the size of the switching angular displacement WTA. If WTA extends over several increments, then MW is likewise selected to span several angular increments. Preferably, the number of increments over which the measuring range extends is equal to the number of increments over which the switching displacement extends.

A further improvement of the present invention over the prior art is obtained by keeping WD, the angular duration of solenoid triggering, constant, regardless of the rotational speed. Referring to the first expression above, it is clear that as rotational speed n increases, the residual times TB and TE decrease accordingly. The result is that the trigger beginning instant E and the trigger ending instant A are shifted up to an earlier time. Furthermore, referring to the second expression above, as rotational speed n increases, WTA increases accordingly. With WD remaining constant, as WTA increases with rotational speed, the angular range over which the solenoid valve is actually closed, and, thus, over which fuel is delivered, decreases. Thus, given a rising rotational speed with a constant solenoid trigger angular duration, WD, a decreasing quantity of fuel delivery results.

FIG. 5 shows the solenoid trigger signal for three different rotational speeds, and how WTA, RWB and E vary accordingly. It is important to note that the horizontal scale is angular position and not time. Fuel-metering is independent of rotational speed at the desired beginning-of-delivery angle WB. The desired angular position WB of the fuel pump at the time fuel delivery begins is represented by the dashed perpendicular line.

Figure 5A:
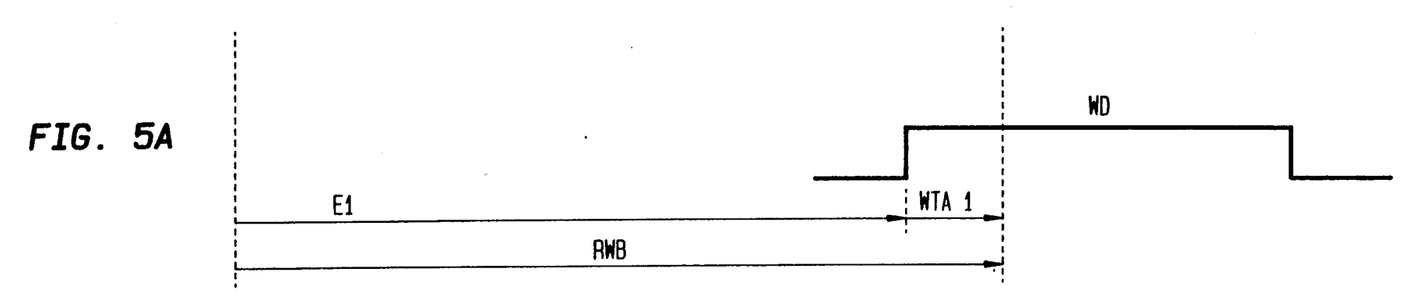
FIGS. 5a–c show the solenoid-valve trigger signal at three different rotational speeds.

The solenoid trigger signal for a low rotational speed is shown in FIG. 5a. The switching angular displacement WTA1 of the solenoid valve is very short. The trigger instant E1 shortly precedes WB. The majority of the solenoid trigger duration follows WB, the desired angular position at which fuel delivery begins.

Figure 5B:
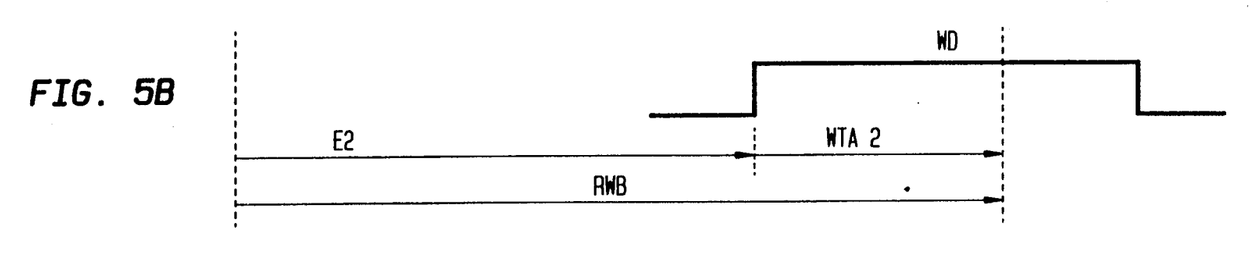

The solenoid trigger signal for a higher rotational speed is shown in FIG. 5b. WTA2 is perceptibly larger than WTA1. The trigger instant E2 has perceptibly moved up to an earlier angular position. Only a small part of the trigger angular duration WD still lies after WB. Thus, the quantity of fuel delivered is less in this case than in that depicted in FIG. 5a.

Figure 5C:
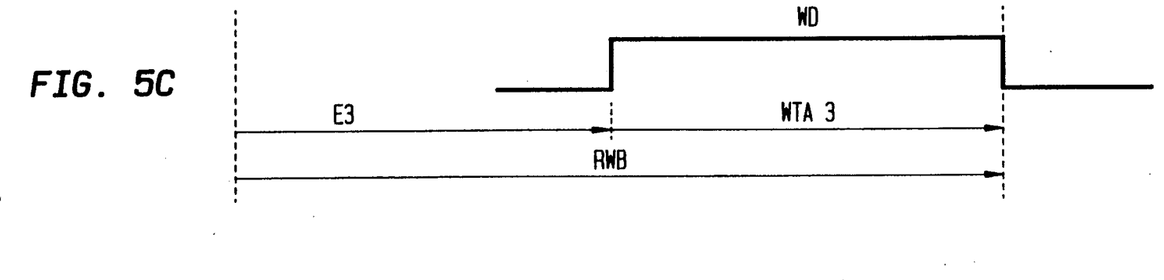

The solenoid trigger signal for a very high rotational speed is shown in FIG. 5c. The switching angular displacement WTA3 is virtually as large as the trigger angular duration WD. The trigger instant E3 is moved up to an even earlier angular position. Only an extremely small part of the trigger duration still lies beyond WB. The quantity of injected fuel is now even less than in the case of FIG. 5b.

The terms and expressions which are employed herein are used as terms of expression and not of limitation. There is no intention, in the use of such terms and expressions, of excluding the equivalents of the features shown and described, or of portions thereof, it being recognized that various modifications are possible within the scope of the invention.

What is claimed:

1. A method for controlling a fuel-metering system regulated by a solenoid valve, comprising the steps of:
   (a) determining an angular position of a predetermined rotating engine component for the start of delivery of fuel to the engine;
   (b) determining an angular displacement of the predetermined rotating engine component over which fuel will be delivered to the engine;
   (c) determining the angular position of the predetermined rotating engine component for the end of fuel delivery to the engine;
   (d) determining switching times needed for the solenoid valve to close and to open;
   (e) computing an instant for triggering the solenoid valve to close based on the angular position of the predetermined rotating engine component for the start of fuel delivery and the switching time to close the solenoid valve; and
   (f) computing an instant for triggering the solenoid valve to open based on the angular position of the predetermined rotating engine component for the start of fuel delivery, the angular displacement of the predetermined rotating engine component over which fuel will be delivered, and the switching time to open the solenoid valve.

2. The method as recited in claim 1, wherein determination steps (a), (b), (c), and (d) are based on an average of values from a plurality of solenoid values.

3. The method as recited in claim 1, wherein step (e) further comprises converting the switching time needed to close the solenoid value into an angular displacement through which the predetermined rotating engine component rotates, at a first rotational speed, during such switching time.

4. The method as recited in claim 1, wherein step (f) further comprises converting the switching time needed to open the solenoid valve into an angular displacement through which the predetermined rotating engine component rotates, at a second rotational speed, during such switching time.

5. The method as recited in claim 3 wherein step (e) further comprises the sub-steps of:
   (1) separating the angular position for the start of delivery of fuel into an start integral component and a start residual component;
   (2) reducing the start residual component by an angular displacement equivalent to the switching time to close the solenoid valve;
   (3) converting reduced start residual component into an equivalent start time quantity; and
   (4) computing the instant for the start of the delivery of fuel from the equivalent start time quantity.

6. The method as recited in claim 4, wherein step (f) further comprises the sub-steps of:
   (1) separating an angular position of the predetermined rotating engine component for the end of the delivery of fuel into an end integral component and a end residual component;
   (2) reducing the end residual component by an angular displacement equivalent to the switching time to open the solenoid valve;
   (3) converting the reduced end residual component into an equivalent end time quantity; and
   (4) computing the instant for the end of the delivery of fuel from the equivalent end time quantity.

7. The method as recited in claim 3, wherein the first rotational speed is determined by measuring the time required for the predetermined rotating engine component to rotate from a first angular position to a second angular position, with the first and second angular positions being selected to proximally precede the instant for the start of the delivery of fuel.

8. The method as recited in claim 4, wherein the second rotational speed is determined by measuring the time required for the predetermined rotating engine component to rotate from a third angular position to a fourth angular position, with the angular positions being selected to proximally precede the instant for the end of the delivery of fuel.

9. The method as recited in claim 7, wherein the angular displacement between the first and second angular positions is approximately equal to the angular displacement of the switching time to close the solenoid valve.

10. The method as recited in claim 8, wherein the angular displacement between the third and fourth angular positions is approximately equal to an angular displacement of the switching time to open the solenoid valve.

11. A device for controlling a fuel-metering system regulated by a solenoid valve, comprising:
means for determining an angular position of a predetermined rotating engine component at a beginning of the delivery of fuel to the engine;
means for determining the angular displacement of the predetermined rotating engine component over which fuel will be delivered to the engine;
means for determining an angular position of a predetermined rotating engine component at an end of the delivery of fuel to the engine;
means for determining a switching time required for the solenoid valve to close;
means for determining switching time required for the solenoid valve for open;
means for computing an instant when the solenoid valve is triggered to close based on the angular position of the predetermined rotating engine component when fuel delivery is to begin and the switching time for the solenoid valve to close; and
means for computing an instant when the solenoid valve is triggered to open based on the angular position of the predetermined rotating engine component when fuel delivery is to begin, the angular displacement of the predetermined rotating engine component over which fuel is delivered to the engine, and the switching time for the solenoid value to open.

12. The device as recited in claim 11, wherein the fuel-metering system includes more than one solenoid valve.

13. The device as recited in claim 11 wherein the computing means further converts the switching time required for the solenoid valve to close into an angular displacement through which the predetermined rotating engine component rotates, at a first rotational speed, during such switching time.

14. The device as recited in claim 11, wherein the computing means further converts the switching time required for the solenoid valve to open into an angular displacement through which the predetermined rotating engine component rotates, at a second rotational speed, during such switching time.

15. The device as recited in claim 13 wherein the computing means at least,
separates the angular position of the predetermined rotating engine component at the beginning of fuel delivery into a start integral component and a start residual component;
reduces the start residual component by an angular displacement of the predetermined rotating engine component equivalent to the switching time required to close the solenoid valve;
converts the reduced residual component into an equivalent start time quantity; and
computes an instant when the solenoid valve is triggered to close based on the equivalent start time quantity.

16. The device as recited in claim 14, wherein the computing means at least,
separates the angular position of the predetermined rotating engine component at the end of fuel delivery into an end integral component and an end residual component;
reduces the end residual component by an angular displacement of the predetermined rotating engine component equivalent to the switching time required to open the solenoid valve;
converts the reduced end residual component into an equivalent end time quantity; and
computes the an instant when the solenoid valve is triggered to close based on the equivalent end time quantity.

17. The device as recited in claim 13 wherein the first rotational speed is determined by measuring the time required for the predetermined rotating engine component to rotate, at the first rotational speed, from a first angular position to a second angular position, with the first and second angular positions being selected to proximally precede the instant when the solenoid valve is triggered to close.

18. The device as recited in claim 14, wherein the second rotational speed is determined by measuring the time required for the predetermined rotating engine component to rotate, at the second rotational speed, from a third angular position to a fourth angular position, with the angular positions being selected to proximally precede the A instant when the solenoid valve is triggered to open.

19. The device as recited in claim 17, wherein the angular displacement between the first and second angular positions is approximately equal to the angular displacement of the switching time to close the solenoid valve.

20. The device as recited in claim 18, wherein the angular displacement between the third and fourth angular positions is approximately equal to the angular displacement of the switching time to open the solenoid valve.

* * * * *